(12) United States Patent
Furuta et al.

(10) Patent No.: US 10,728,211 B2
(45) Date of Patent: Jul. 28, 2020

(54) ELECTRONIC APPARATUS, COMMUNICATION SYSTEM, AND A NON-TRANSITORY COMPUTER-READABLE RECORDING MEDIUM

(71) Applicant: SEIKO EPSON CORPORATION, Tokyo (JP)

(72) Inventors: Yasuhiro Furuta, Shimosuwa (JP); Toshiatsu Okamoto, Shiojiri (JP); Tomohiro Takahashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/274,078

(22) Filed: Feb. 12, 2019

(65) Prior Publication Data

US 2019/0253384 A1 Aug. 15, 2019

(30) Foreign Application Priority Data

Feb. 14, 2018 (JP) ................................ 2018-023786

(51) Int. Cl.
*H04L 29/12* (2006.01)

(52) U.S. Cl.
CPC ...... *H04L 61/2046* (2013.01); *H04L 61/1511* (2013.01); *H04L 61/2007* (2013.01); *H04L 61/2038* (2013.01); *H04L 61/2076* (2013.01); *H04L 61/2084* (2013.01); *H04L 61/2092* (2013.01); *H04L 61/305* (2013.01); *H04L 61/3005* (2013.01)

(58) Field of Classification Search
CPC ............. H04L 61/1511; H04L 61/2007; H04L 61/2038; H04L 61/2046; H04L 61/2076; H04L 61/2084; H04L 61/2092; H04L 61/3005; H04L 61/305; H04L 29/12066; H04L 41/0631; H04L 41/0856; H04L 63/0442; H04L 67/1036; H04L 9/3263

See application file for complete search history.

(56) References Cited

U.S. PATENT DOCUMENTS

| | | | | |
|---|---|---|---|---|
| 2017/0295133 A1* | 10/2017 | Barber | .............. | H04L 29/12066 |
| 2017/0339096 A1* | 11/2017 | Krzywonos | ......... | H04L 61/1511 |
| 2017/0374042 A1* | 12/2017 | James | ................. | H04L 63/0442 |
| 2018/0063237 A1* | 3/2018 | Cui | ..................... | H04L 67/1036 |
| 2018/0212923 A1* | 7/2018 | Williams | ............ | H04L 61/2007 |

(Continued)

FOREIGN PATENT DOCUMENTS

JP 2004-328358 A 11/2004

*Primary Examiner* — Le H Luu
(74) *Attorney, Agent, or Firm* — Workman Nydegger

(57) ABSTRACT

Provided is an electronic apparatus that possibly registers a domain name, an IP address, and identification information on the electronic apparatus itself with a DNS server, which includes a communication unit and a processing unit. When the domain name of the electronic apparatus is registered with the DNS server, the processing unit makes an acquisition request for identification information that is associated with the domain name of the electronic apparatus. In a case where the acquired identification information is not the same as the identification information on the electronic apparatus, the processing unit changes the domain name, and performs processing that registers the IP address and the identification information with the DNS server in a state of being associated with a post-change domain name.

15 Claims, 9 Drawing Sheets

(56) References Cited

U.S. PATENT DOCUMENTS

| | | | |
|---|---|---|---|
| 2018/0309712 A1* | 10/2018 | Jeong | H04L 61/1511 |
| 2018/0375729 A1* | 12/2018 | Tzoreff | H04L 41/0856 |
| 2019/0036708 A1* | 1/2019 | Fregly | H04L 9/3263 |
| 2019/0149396 A1* | 5/2019 | Zafer | H04L 41/0631 |
| | | | 709/224 |

* cited by examiner

FIG. 4

|  | MODEL NAME | IP ADDRESS | IDENTIFICATION INFORMATION (SERIAL NUMBER) | SETTING OF REGISTRATION DESTINATION |
|---|---|---|---|---|
| ELECTRONIC APPARATUS 101 | printer | 11.11.11.11 | 11 | example.jp |
| ELECTRONIC APPARATUS 102 | printer | 22.22.22.22 →66.66.66.66 | 22 | example.jp |
| ELECTRONIC APPARATUS 103 | printer | 33.33.33.33 | 33 | example.jp |
| ELECTRONIC APPARATUS 104 (NON-CORRESPONDING APPARATUS) | scanner | 44.44.44.44 | 44 | example.jp |
| ELECTRONIC APPARATUS 105 | scanner | 55.55.55.55 | 55 | example.jp |

FIG. 5

| DOMAIN NAME | A RECORD | TXT RECORD |
|---|---|---|
| printer.example.jp | 11.11.11.11 | serial=11 |

FIG. 6

| DOMAIN NAME | A RECORD | TXT RECORD |
|---|---|---|
| printer.example.jp | 11.11.11.11 | serial=11 |
| printer-2.example.jp | 22.22.22.22 | serial=22 |

FIG. 7

| DOMAIN NAME | A RECORD | TXT RECORD |
|---|---|---|
| printer.example.jp | 11.11.11.11 | serial=11 |
| printer-2.example.jp | 22.22.22.22 | serial=22 |
| printer-3.example.jp | 33.33.33.33 | serial=33 |

FIG. 8

| DOMAIN NAME | A RECORD | TXT RECORD |
|---|---|---|
| printer.example.jp | 11.11.11.11 | serial=11 |
| printer-2.example.jp | 66.66.66.66 | serial=22 |
| printer-3.example.jp | 33.33.33.33 | serial=33 |

FIG. 10

| DOMAIN NAME | A RECORD | TXT RECORD |
|---|---|---|
| printer.example.jp | 11.11.11.11 | serial=11 |
| printer-2.example.jp | 66.66.66.66 | serial=22 |
| printer-3.example.jp | 33.33.33.33 | serial=33 |
| scanner.example.jp | 44.44.44.44 | NONE |

FIG. 11

| DOMAIN NAME | A RECORD | TXT RECORD |
|---|---|---|
| printer.example.jp | 11.11.11.11 | serial=11 |
| printer-2.example.jp | 66.66.66.66 | serial=22 |
| printer-3.example.jp | 33.33.33.33 | serial=33 |
| scanner.example.jp | 44.44.44.44 | NONE |
| scanner-2.example.jp | 55.55.55.55 | serial=55 |

ELECTRONIC APPARATUS, COMMUNICATION SYSTEM, AND A NON-TRANSITORY COMPUTER-READABLE RECORDING MEDIUM

BACKGROUND

1. Technical Field

The present invention relates to an electronic apparatus, a communication system, and a program.

2. Related Art

A technique is widely known that associates a domain name and an Internet Protocol (IP) address in a network. An IP address, for example, is expressed as a string of numbers, such as 192.168.0.1, in the case of Internet Protocol Version 4 (IP v4). Because of this, it is not easy for a user to correctly store an IP address of a desired apparatus. What is difficult for the user to understand is also the same as in a case where an IP address in compliance with Internet Protocol Version 6 (IP v6) is used. In contrast to this, for a domain name, a character string, such as "printer.example.jp", that is easy for the user to understand can be used. By associating the domain name and the IP address, it is possible that user convenience when having access to a desired apparatus is improved. It is noted that processing which associates the domain name and the IP address, and, in a narrow sense, processing which specifies the IP address based on the domain name, is hereinafter expressed as name resolution.

However, in order to suitably perform the name resolution, collision of the domain name between different apparatuses has to be avoided. For example, in JP-A-2004-328358, a technique that avoids collision of a host name within a local network is disclosed. The host name here is information indicating a name of each apparatus within a network, and in the case of "printer.example.jp" described above, which is an example, "printer" is a host name. "example.jp" is a name that is attached to a given area on a network, and a domain name in a narrow sense refers to "example.jp". On the other hand, information in which a host name and a domain name are not omitted, such as "printer.example.jp" is referred to as a fully qualified domain name (FQDN).

A technique in JP-A-2004-328358 is only to avoid the collision of the host name within the local network. As in a case where an electronic apparatus is accessed from a smartphone or the like via a mobile network, in a case where networks to which an apparatus that is an access source and an apparatus that is an access destination are connected are different, it is difficult to perform communication using only the host name. In this case, there is a need to use the domain name that is a name that is globally unique, or the like.

Furthermore, in a case where the electronic apparatus is registered with a domain name system (DNS) server in a state of being associated with the IP address and the domain name, there is a likelihood that multiple different electronic apparatuses on a network will attempt to register the same domain name. In the technique in JP-A-2004-328358, the collision of the host name within the local network cannot be avoided. Because of this, the collision of the domain name can be avoided.

SUMMARY

An advantage of some aspects of the invention is to provide an electronic apparatus, a communication system, and a program, all of which control collision of a domain name by registering apparatus-specific information with a DNS server in a state of being associated with a domain name.

According to an aspect of the invention, there is provided an electronic apparatus that possibly registers a domain name, an Internet Protocol (IP) address, and identification information on the electronic apparatus itself with a domain name system (DNS) server that stores a domain name, an IP address, and identification information on a prescribed apparatus in a state of being associated with each other, the electronic apparatus including: a communication unit that performs communication via a network; and a processing unit that performs communication control of the communication unit, in which the processing unit that, when the domain name of the electronic apparatus is registered with the DNS server, makes an acquisition request to the DNS server for the identification information that is associated with a domain name that is the same as the domain name of the electronic apparatus, and in which, in a case where the identification information is present in the DNS server and where the acquired identification information is not the same as the identification information on the electronic apparatus, the processing unit changes the domain name of the electronic apparatus, and performs processing that registers the IP address of the electronic apparatus and the identification information on the electronic apparatus with the DNS server in a state of being associated with a post-change domain name of the electronic apparatus.

According to the aspect of the invention, the electronic apparatus is configured in such a manner that the domain name, the IP address, and the identification information on the electronic apparatus itself are possibly registered with the DNS server in a state of being associated with each other. Then, before the domain name and the like are registered, an acquisition request is made for the identification information that is associated with the domain name that is going to be registered, and it is determined whether or not the acquired identification information and the identification information on the electronic apparatus itself are the same. In a case where the pieces of identification information are not the same, it is determined that the domain name that is associated with the identification information is used by any other electronic apparatus. Because of this, the collision of the domain name can be suppressed by making an attempt to register a different domain name. That is, according to the aspect of the invention, it is possible that the collision of the domain name is suppressed in a configuration in which the DNS server is used, and so on.

Furthermore, in the electronic apparatus, in a case where the identification information that is associated with the domain name which is the same as the domain name of the electronic apparatus is present in the DNS server and where the acquired identification information is the same as the identification information on the electronic apparatus, the processing unit may perform processing that updates at least one of the IP address and the identification information that are associated with the domain name of the electronic apparatus.

If this is done, because it is determined that the domain name which is a target is one that is registered by the electronic apparatus itself, it is possible that the same domain name is continuously used.

Furthermore, in the electronic apparatus, in a case where the domain name that is the same as the domain name of the electronic apparatus is not present in the DNS server, the processing unit may perform processing that registers the domain name of the electronic apparatus, the IP address of the electronic apparatus, and the identification information on the electronic apparatus with the DNS server, in a state of being associated with each other.

If this is done, because it can be determined that the domain name that is a target is not used by any apparatus, it is possible that the domain name is registered as the domain name of the electronic apparatus itself and is used.

In the electronic apparatus, the processing unit may make an acquisition request to the DNS server for the IP address and the identification information that are associated with the domain name which is the same as the domain name of the electronic apparatus, and, in a case where the IP address is present and the identification information is not present, the processing unit may change the domain name of the electronic apparatus, and may perform processing that registers the IP address of the electronic apparatus and the identification information on the electronic apparatus with the DNS server in a state of being associated with the post-change domain name of the electronic apparatus.

If this is done, even in a case where an apparatus in which the technique according to the present embodiment does not find application uses the DNS server, it is possible that the collision of the domain name with the apparatus is suitably suppressed.

In the electronic apparatus, the processing unit may make an acquisition request with the DNS server for the IP address, the identification information, a term of validity of the IP address, and a term of validity of the identification information, which are associated with the domain name that is the same as the domain name of the electronic apparatus, and, in a case where the IP address is present and the identification information is present and where it is determined that the term of validity of the identification information is shorter than the term of validity of the IP address, the processing unit may change the domain name of the electronic apparatus and performs processing that registers the post-change domain name of the electronic apparatus with the DNS server in a state of being associated with the IP address of the electronic apparatus and the identification information on the electronic apparatus.

If this is done, even in the case where an apparatus in which the technique according to the present embodiment does not find application uses the DNS server, it is possible that the collision of the domain name with the apparatus is suitably suppressed.

Furthermore, in the electronic apparatus, a storage unit may be further included in which the domain name of the electronic apparatus that is registered with the DNS server is stored, in which, when at least the electronic apparatus is powered on, the processing unit may perform processing that reregisters the domain name of the electronic apparatus which is stored in the storage unit, with the DNS server.

In this manner, by setting the completely-registered domain name to be a reregistration target, the probability of the same domain name being able to be continuously used is increased and it is possible that access from any other apparatus is made easy.

Furthermore, in the electronic apparatus, the storage unit may be a non-volatile memory.

If this is done, even in a case where power is off, the probability of the domain name being continuously used is increased and it is possible that access from any other apparatus is made easy.

Furthermore, according to another aspect of the invention, there is provided a communication system including any one of the electronic apparatuses described and the DNS server.

Furthermore, according to still another aspect of the invention, there is provided a program that operates an electronic apparatus that possibly registers a domain name, an IP address, and identification information on the electronic apparatus itself with a DNS server that stores a domain name, an IP address, and identification information on a prescribed apparatus in a state of being associated with each other, the program causing the electronic apparatus to function as: a communication unit that performs communication via a network; and a processing unit that performs communication control of the communication unit, in which the processing unit that, when the domain name of the electronic apparatus is registered with the DNS server, makes an acquisition request to the DNS server for the identification information that is associated with a domain name that is the same as the domain name of the electronic apparatus, and in which, in a case where the identification information is present in the DNS server and where the acquired identification information is not the same as the identification information on the electronic apparatus, the processing unit changes the domain name of the electronic apparatus, and performs processing that registers the IP address of the electronic apparatus and the identification information on the electronic apparatus with the DNS server in a state of being associated with a post-change domain name of the electronic apparatus.

BRIEF DESCRIPTION OF THE DRAWINGS

The invention will be described with reference to the accompanying drawings, wherein like numbers reference like elements.

FIG. 4 is a diagram illustrating an example of information on each apparatus.

FIG. 5 is a diagram illustrating a situation of registration with a DNS server.

FIG. 6 is a diagram illustrating a situation of the registration with the DNS server.

FIG. 7 is a diagram illustrating a situation of the registration with the DNS server.

FIG. 8 is a diagram illustrating a situation of the registration with the DNS server.

FIG. 10 is a diagram illustrating a situation of the registration with the DNS server.

FIG. 11 is a diagram illustrating a situation of the registration with the DNS server.

DESCRIPTION OF EXEMPLARY EMBODIMENTS

The present embodiment will be described below. It is noted that the present embodiment which will be described below does not improperly limit the subject matter of the invention that is claimed in a claim. Furthermore, all configurations that will be described in the present embodiment are not necessarily configurational requirements for the invention.

1. Technique According to the Present Embodiment

Figure 1:
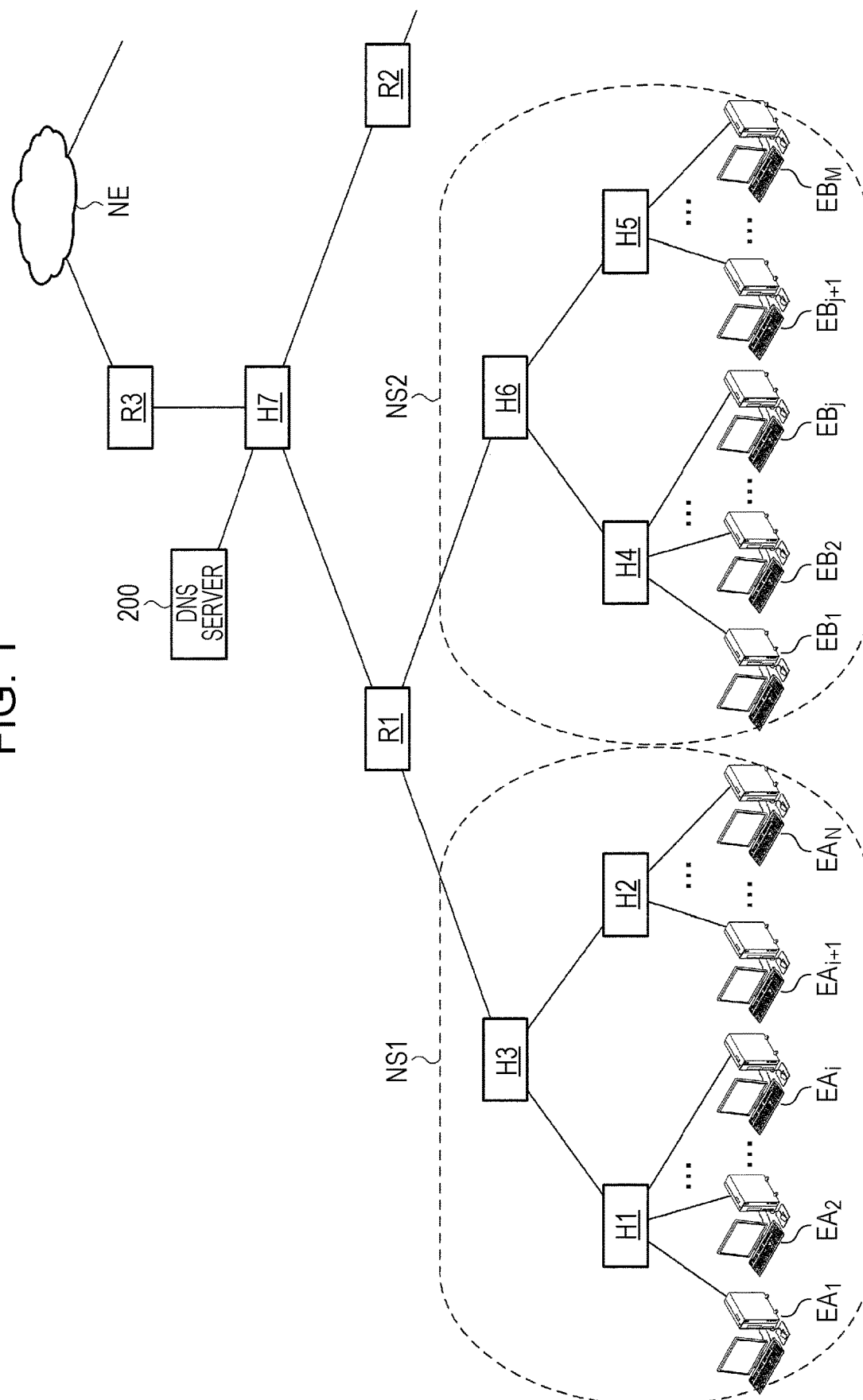
FIG. 1 is a diagram of a network configuration for describing a technique according to the present embodiment.

FIG. 1 is an example of a network configuration for describing a technique according to the present embodiment. In an example in FIG. 1, i (i is a given integer) electronic apparatuses $EA_1$ to $EA_i$ are connected to a hub H1, and (N−i) (N is an integer that is greater than i) electronic apparatus apparatuses $EA_{i+1}$ to $EA_N$ are connected to a hub H2. The hub H1 and the hub H2 are connected to a hub H3. Hubs (H1 to H7) in FIG. 1 are line concentrators or repeating devices on a network, and, for example, are hubs that comply with Ethernet standards (Ethernet is a registered trademark). However, network standards in the present embodiment are not limited to Ethernet, and possibly further includes other standards.

In the same manner, j (j is a given integer) electronic apparatuses $EB_1$ to $EB_j$ are connected to a hub H4, and (M−j) (M is an integer that is greater than j) electronic apparatuses $EB_{j+1}$ to $EB_M$ are connected to a hub H5. The hub H4 and the hub H5 are connected to the hub H6.

The hub H3 and the hub H6 are connected to a router R1. Routers (R1 to R3) are communication apparatuses that relay data among two or more different networks in a computer network, and make selections of transfer paths (routing). At this point, it is possible that electronic apparatuses $EA_1$ to $EA_N$ perform communication with each other without a router being involved. In other words, a broadcast packet that is transmitted from any one apparatus of the electronic apparatuses $EA_1$ to $EA_N$, any apparatus remains within the reach of all the electronic apparatuses $EA_1$ to $EA_N$, and the electronic apparatuses $EA_1$ to $EA_N$ is one segment (a network segment NS1). In the same manner, the electronic apparatuses $EB_1$ to $EB_M$ are one segment (a network segment NS2). Because an electronic apparatus $EA_p$ (p is an integer that satisfies 1≤p≤N) and an electronic apparatus $EB_q$ (q is an integer that satisfies 1≤q≤M) belong to different network segments, a broadcast packet from the electronic apparatus $EA_p$ does not reach the electronic apparatus $EB_q$.

JP-A-2004-328358 discloses a technique for performing name resolution in one network segment of a local network. With the technique in JP-A-2004-328358, it may be possible that collision of a host name is avoided between the electronic apparatuses $EA_1$ to $EA_N$ or that collision of a host name is avoided between each of the electronic apparatus $EB_1$ to $EB_M$.

However, the technique in JP-A-2004-328358 has several problems to be solved. Firstly, in the technique in JP-A-2004-328358, reliability is insufficient in terms of ensuring whether or not the collision of the host name can be really avoided. In the technique in JP-A-2004-328358, an echo request message destined for all link local node multicast addresses is transmitted, and the collision of the host name is determined, depending on whether or not the echo response message is returned as a response. Regardless of the presence of two or more same host names, in a case where an unsuitable apparatus, such as one that does not reply with the echo response message, is present within the same network segment, the name resolution is not suitably performed.

Secondly, in the technique in JP-A-2004-328358, access from different network segments is not assumed. For example, a case is considered where, in a comparatively large-sized office, a network segment for every department is managed and where a first department and second department are assigned the network segment NS1 and the network segment NS2, respectively. In this example, in a case where a user who works for the second department has access to a computer that is present in the first department, that is, in a case where the electronic apparatus $EB_q$ that belongs to the network segment NS2 has access to the electronic apparatus $EA_p$ that belongs to the network segment NS1, the access is regarded as access from a different network segment. Alternatively, if an enterprise has different offices (branch offices) in remote places, a case is also considered where a user who works for the branch office has access to a computer that is present in the head office, via the Internet. Alternatively, there is a case where a user who stays outdoors has access to a computer that is present in an enterprise for which the user works, using a portable terminal apparatus such as a portable telephone. In an example in FIG. 1, a router R3 is connected to the Internet NW, and a computer or a portable terminal apparatus in a branch office has access to the electronic apparatus $EA_p$ that belongs to the network segment NS1 via the Internet NW. The access is also regarded as access from a different network segment. In these cases, it is difficult to perform communication using only the host name as is the case with the technique in JP-A-2004-328358, and there is a need to use a domain name that is globally unique, or the like.

In contrast to this, a technique is considered that uses a DNS server 200 which stores a domain name and an IP address of each apparatus in an associated manner. In FIG. 1, an example where the DNS server 200 is connected to a hub H7 is illustrated, but no limitation to this is imposed. The DNS server 200 may be included in the network segment NS1, may be included in the network segment NS2, and may be provided on the Internet NW. Because domain names of multiple apparatuses can be managed using the DNS server 200, an improvement in the reliability in the name resolution is possible.

However, in a case where a given apparatus registers a domain name of the apparatus itself and then makes an inquiry about information (a resource record) relating to the domain name, to the DNS server 200, a response to the effect that "the domain name is present" is acquired. On the other hand, even in a case where any other apparatus already uses the same domain name, the response to the effect that "the domain name is present" is acquired in a response to the inquiry relating to the domain name. That is, only from a response that a domain name that the given apparatus itself is going to use has been registered with the DNS server 200, it cannot be determined whether or not the domain name may be used. It can be said that the technique in JP-A-2004-328358 that avoids the collision of the host name based on whether or not the echo response message is returned as a response, as is, find application in cases where the DNS server 200 is used.

Furthermore, in the technique in JP-A-2004-328358, only the collision of the host name within the network segment is avoided, and a host name of the electronic apparatus $EA_p$ in the network segment NS1 is allowed to be the same as a host name of the electronic apparatus $EB_q$ in the network segment NS2. In this case, collision between the domain name that the electronic apparatus $EA_p$ is going to register with the DNS server 200 and the domain name that the electronic apparatus $EB_q$ is going to register with the DNS server 200 cannot be avoided.

Figure 2:
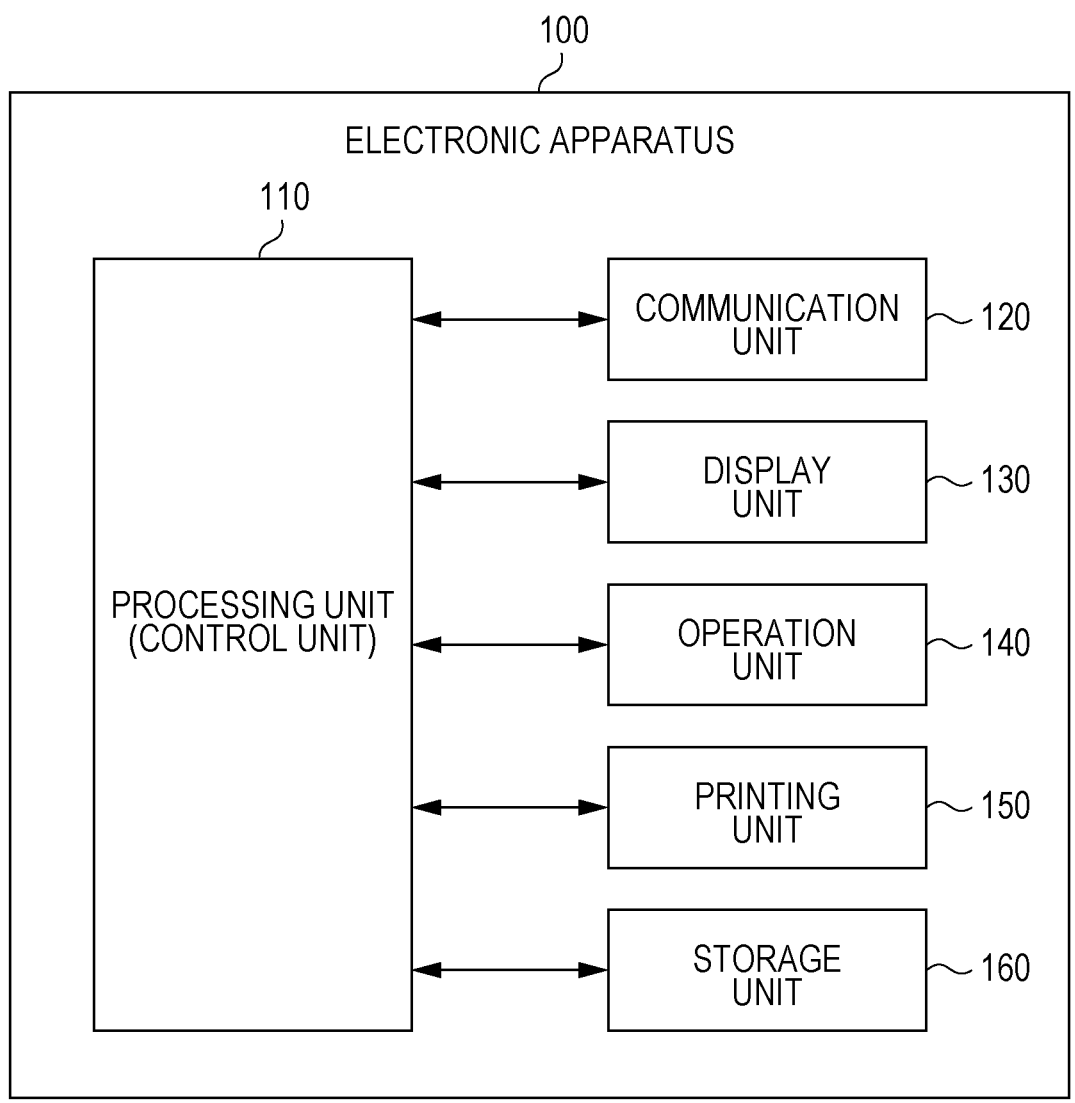
FIG. 2 is a diagram illustrating a configuration of an electronic apparatus according to the present embodiment.

An electronic apparatus 100 according to the present embodiment is an electronic apparatus that is capable of registering its own domain name, IP address, and identification information with the DNS server 200 in which a domain name, an IP address, and identification information ion a prescribed apparatus are stored in an associated manner, and, as illustrated in FIG. 2, includes a communication unit 120 that performs communication via a network and a processing unit 110 that performs communication control of the communication unit 120.

When a domain name of the electronic apparatus 100 is registered with the DNS server 200, the processing unit 110 makes an acquisition request to the DNS server 200 for identification information that is associated with a domain name which is the same as the domain name of the electronic apparatus 100. Then, in a case where the identification information is present in the DNS server 200 and where the acquired identification information is not the same as identification information on the electronic apparatus 100, the processing unit 110 changes the domain name of the electronic apparatus 100, and performs processing that registers an IP address of the electronic apparatus 100 and the identification information on the electronic apparatus 100 wish the DNS server 200, in a state of being associated with a post-change domain name of the electronic apparatus 100.

The domain name here is an FQDN in a narrow sense, but no limitation to this is imposed. For example, in a case where it is possible that the DNS server 200 performs processing that automatically complements a prescribed domain name, a domain name, for which a registration request is made by the electronic apparatus 100, may be in a format from which one portion of the FQDN is omitted.

Furthermore, the domain name of the electronic apparatus 100 is a domain name that the electronic apparatus 100 itself makes an attempt to register with the DNS server 200, as a domain name representing the electronic apparatus 100 itself. That is, in some cases, the domain name of the electronic apparatus 100, as is, is completely registered, as a domain name that represents the electronic apparatus 100, with the DNS server 200. In other cases, the domain name of the electronic apparatus 100 also collides with a domain main of any other apparatus and because of this, is changed.

Furthermore, the identification information on the prescribed apparatus is information for distinguishing between the prescribed apparatus and any other apparatus. As the identification information, information that is not the same among multiple apparatuses, or information that has a very low likelihood of being the same among multiple apparatuses is used. The identification information may be a serial number that is assigned to each apparatus, may be a MAC address, and may be any other information.

The DNS server 200 stores a resource record in a state of being associated with a given domain name. There are present multiple types of resource records. For example, an A record represents an IP v4 IP address, and an AAAA record represents an IP v6 IP address. Furthermore, resource records include a TXT record in which text information is storable, and the identification information on the apparatus, for example, is stored in the TXT record.

The electronic apparatus 100, which will be described below with reference to FIG. 5 and other figures, make a request to register the TXT record that includes a character string, such as "serial=xx", and thus registers the identification information with the DNS server 200 in a state of being associated with a domain name. "xx" is a character string representing identification information on an apparatus. Furthermore, at a stage where information is referred to, the electronic apparatus 100 transmits a DNS packet that requests the TXT record, which corresponds to a given domain name, to the DNS server 200, and performs processing that recognizes as the identification information a portion that continues from "serial=", of the resource record in the DNS packet, with which the DNS server replies. However, various modified implementations of the technique that causes the identification information to be included in the resource record are possible. An example will be described below in which an IP address corresponds to the A record and in which identification information corresponds to the TXT record.

With the technique according to the present embodiment, in a case where the domain name that the given apparatus itself is going to use is already registered with the DNS server 200, it is possible to determine whether or not the domain name is one that the given apparatus itself has registered in the past or one that any other apparatus registers, based on the identification information. In a case where the identification information that is stored in the DNS server 200 is the same as the identification information on the given apparatus itself, because it can be determined that the domain name which the given apparatus itself is going to use is registered by any other apparatus, the electronic apparatus 100 again makes an attempt to register a different domain name.

Accordingly, with a configuration in which the DNS server 200 is used for the name resolution, it is possible that the collision of the domain name is automatically controlled on the electronic apparatus 100 side. Because the automatic collision control is possible, there is no need to use in advance a complicated domain name that has a low probability of collision, and a simple domain name that is easy for the user to understand can be used. Moreover, because the domain name is used, access to the electronic apparatus 100 according to the present embodiment from any other network segment is possible such as access via the Internet.

FIG. 2 is a block diagram illustrating an example of a configuration of the electronic apparatus 100. The electronic apparatus 100, for example, is a printer (a printing apparatus). The printer is an apparatus that prints a character, an image, or the like on a printing medium based on printing data that is stored in the apparatus itself. Alternatively, the electronic apparatus 100 may be a scanner, a facsimile machine, or a copy machine. The electronic apparatus 100 may be a multifunction peripheral (MFP) that has multiple functions, and a multifunction peripheral that has a printing function is also an example of the printer. Furthermore, the electronic apparatus 100 according to the present embodiment may be an apparatus that is capable of registering a domain name with the DNS server 200, may be a personal computer (PC), may be a portable terminal apparatus, such as a portable telephone or a tablet terminal, and may be any other apparatus.

FIG. 2 illustrates the electronic apparatus 100 (a printer or an MFP) that has the printing function. The electronic apparatus 100 includes the processing unit 110 (a processor), the communication unit 120 (a communication interface), a display unit 130 (a display), an operation unit 140 (an operation panel), a printing unit 150, and a storage unit 160 (a memory).

The processing unit 110 (a processor or a controller) performs control each of the units (the communication unit, the storage unit, the printing unit, and the like) of the electronic apparatus 100, or performs various processing operations according to the present embodiment. For example, the processing unit 110 can include multiple CPUs (MPUs or microcomputers), for example, a main central processing unit (CPU) and a sub-CPU. The main CPU (a main control substrate) performs control of each of the units of the electronic apparatus 100 or overall control. The sub-CPU performs various processing operations for printing, for example, in a case where the electronic apparatus 100 is a printer. Alternatively, a CPU for communication processing may be further provided.

Each processing operation according to the present embodiment, which is performed by the processing unit 110, can be realized by a processor that includes hardware. For example, each processing operation according to the present embodiment can be realized by a processor that operates based on a program and information, and a memory in which the program and the information are stored. The processor here, for example, may cause a function of each unit to be realized in individual hardware or may cause the function of each unit to be realized in integrated hardware. For example, the processor can include a piece of hardware, and the piece of hardware can include at least one of a circuit that processes a digital signal and a circuit that processes an analog signal. For example, the processor can be configured with one, or multiple circuit devices that are mounted on a circuit substrate, or with one or multiple circuit elements. The circuit device here is an IC or the like, and the circuit element is a resistor, a capacitor, or the like. The processor, for example, may be a CPU. However, the processor is not limited to the CPU, and it is possible that various processors such as a graphics processing unit (GPU) and a digital signal processor (DSP) are used. Furthermore, the processor may be a hardware circuit such as an application specific integrated circuit (ASIC). Furthermore, the processor may be configured with multiple CPUs, and may be configured with hardware circuits such as multiple ASICs. Furthermore, the processor may be configured with a combination of multiple CPUs and hardware circuits, such as multiple ASICs.

The communication unit 120 performs communication via a network, in compliance with prescribed communication standard under the control of the processing unit 110. The communication here may be communication that complies with Internet standards, may be communication that complies with Wi-Fi (a registered trademark) standards, and may be communication that complies with any other standards. Furthermore, networks can include a mobile communication network, a public network such as an Internet network, and a fixed telephone network. Furthermore, the network can be realized by a wide area network (WAN), a local area network (LAN), or the like, regardless of whether the network is wired or wireless.

The display unit 130 is configured with a display on which various pieces of information are displayed for the user, and the like, and the operation unit 140 is configured with a button on which the user performs an input operation, and the like. It is noted that, for example, the display unit 130 and the operation unit 140 may be configured to be integrally combined into a touch panel.

The printing unit 150 includes a printing engine. The printing engine has a mechanical configuration in which printing of an image is performed on a printing medium. The printing engine, for example, includes a transportation mechanism, an ink jet type discharge head, and a driving mechanism for a carriage including the discharge head, and the like. The printing engine discharges ink from the discharge head onto the printing medium (a sheet of paper or a piece of cloth) that is transmitted by the transportation mechanism, and thus prints an image on the printing medium. It is noted that the specific configuration of the printing engine is not limited to that described here as an example, and may be one in which printing is performed using a laser method.

Various pieces of information and data, and various programs are stored in the storage unit 160 (a storage device or a memory). The processing unit 110 or the communication unit 120, for example, operates with the storage unit 160 as a working area. The storage unit 160 may be a semiconductor memory, such as a static random access memory (SRAM) or a dynamic random access memory (DRAM), may be a register, be a magnetic memory device such as a hard disk drive (HDD), and may be an optical storage device such as an optical disk. For example, an instruction that is readable by a computer is stored in the storage unit 160, the instruction is executed by the processing unit 110, and thus a function of each of the units of the electronic apparatus 100. The instruction here may be an instruction in an instruction set that makes up the program, and may be an instruction that instructs a hardware circuit of the processing unit 110 to perform an operation.

The domain name of the electronic apparatus 100, which is registered with the DNS server 200, is stored in the storage unit 160. Then, when at least the electronic apparatus 100 is powered on, the processing unit 110 performs processing that reregisters the domain name of the electronic apparatus 100, which is stored in the storage unit 160, with the DNS server 200.

If this is done, the domain name that is registered as a domain name of the given apparatus itself is suitably retained, and at the time of the reregistration a registration request is made by the domain name that is retained. That is, because the domain name of the electronic apparatus 100 is suppressed from being changed, it is possible that convenience in having access to the electronic apparatus 100 from any other apparatus is improved. It is noted that the registration request by the electronic apparatus 100 to the DNS server 200 is made not only one time, but also intermittently. Accordingly, it is possible that a situation of the registration with the DNS server 200 is periodically checked, or that the term of validity of the information that is registered with the DNS server 200 is extended. A timing at which the registration request is made, for example, is the time at which the electronic apparatus 100 is power on, as described above. However, the registration request may be made at any other timing, and the registration request by the electronic apparatus 100 to the DNS server 200 may be made by performing various triggering operations, for example, by performing prescribed processing operation that is performed in the electronic apparatus 100 each time a prescribed time elapsed, by the user performing prescribed operation inputting, and so on.

It is noted that, even in a case where the electronic apparatus 100 is powered off, information on the domain name of the given apparatus itself, which has registered with the DNS server 200, desirably continues to be retained. In a case where the domain name is not retailed, this causes a concern that the domain name of the electronic apparatus 100 will change due to the powering-off and decreases convenience in having access to the electronic apparatus 100 from any other apparatus. Particularly, processing that makes the registration request when the electronic apparatus 100 is powered on can be performed if the domain name is not retained when the power is off.

Consequently, the storage unit 160 in which a domain name is stored is a non-volatile memory. Accordingly, although the power is off, the domain name that has been registered can be retained, and a probability of being able to continue to use the same domain name can be increased. It is noted that there is no need to configure the storage unit 160 of the electronic apparatus 100 only from a non-volatile memory such as a ROM, and that the storage units 160 possibly include a volatile memory in addition to the non-volatile memory.

2. Detail of Processing

Figure 3:
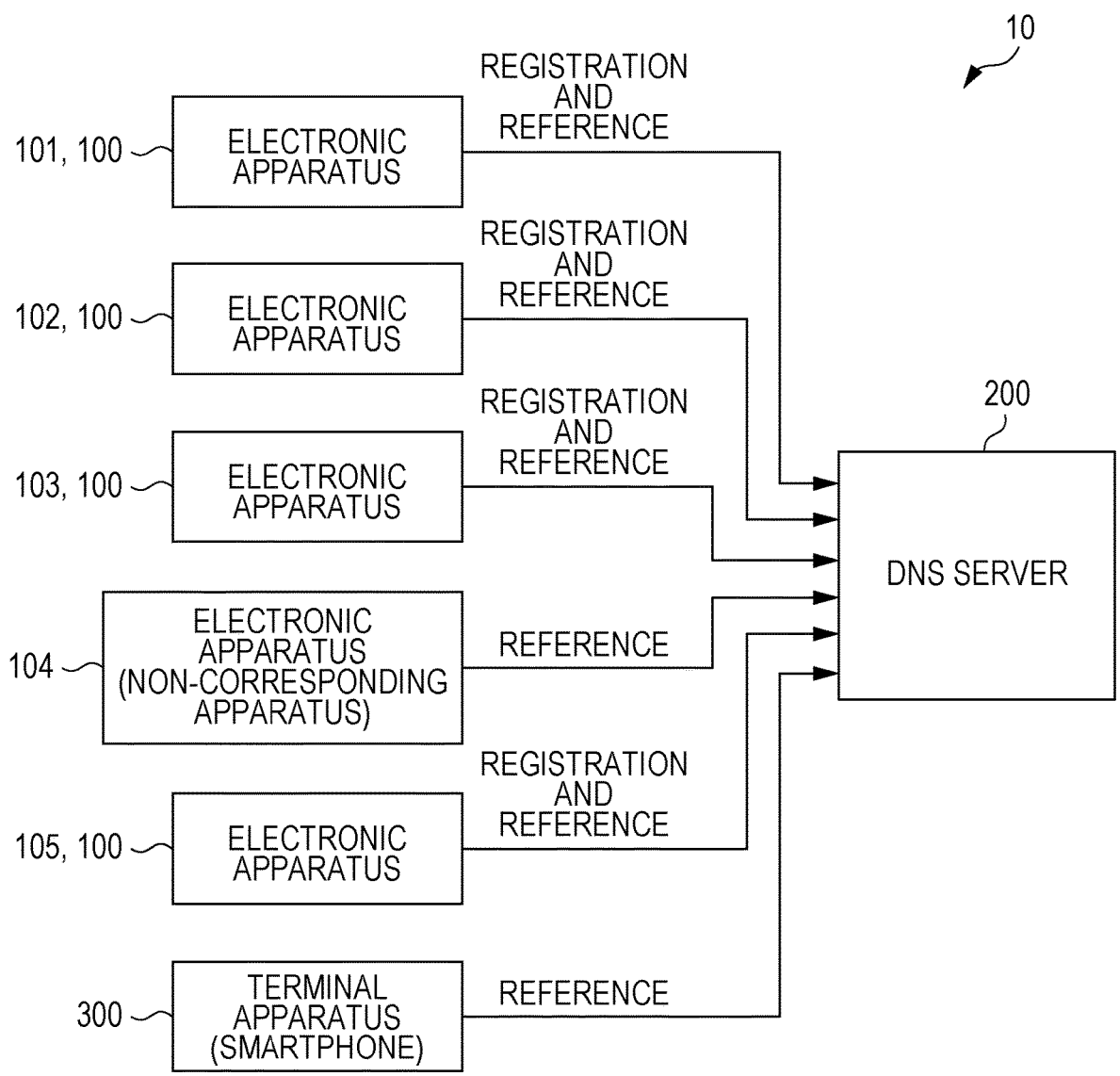
FIG. 3 is a diagram illustrating a communication system that includes the electronic apparatus according to the present embodiment.

Next, processing according to the present embodiment will be described in detail. FIG. 3 is an example of a configuration of a communication system 10 that includes the electronic apparatus 100 and the DNS server 200. In an example in FIG. 3, the communication system 10 includes five electronic apparatuses 101 to 105 and the DNS server 200. At this point, four apparatus, that is, the electronic apparatuses 101, 102, 103, and 105 are the electronic apparatuses 100 in which the technique according to the present embodiment finds application. That is, each of the electronic apparatuses 101, 102, 103, and 105 is configured in a manner that possibly performs processing which registers the identification information with the DNS server 200 in addition to the domain name and the IP address, and, when performing the processing that registers the identification information, performs processing that acquires the identification information from the DNS server 200. The electronic apparatus 100 in which the technique according to the present embodiment finds application is hereinafter expressed as a "corresponding apparatus". The processing that acquires information from the DNS server 200 is hereinafter also expressed suitably as reference processing.

On the other hand, the electronic apparatus 104 is an electronic apparatus that is different from the electronic apparatus 100 in which the technique according to the present embodiment finds application. That is, the electronic apparatus 104 performs processing that registers a domain name and an IP address with the DNS server 200, but does not perform the registration processing or the reference processing of the identification information. The electronic apparatus that the technique according to the present embodiment does not find application is hereinafter expressed as a non-corresponding apparatus.

A terminal apparatus 300 that is illustrated in FIG. 3, for example, is a portable terminal apparatus, such as a smartphone, and is an apparatus that has access to any one of the electronic apparatuses 101 to 105. As illustrated in FIG. 3, the terminal apparatus 300 performs processing that makes an acquisition request to the DNS server 200 for an IP address which corresponds to a domain name of an access target apparatus, and has access to the access target apparatus using the acquired IP address. As described above with reference to FIG. 1, the terminal apparatus 300, for example, has access to the access target apparatus via the Internet.

FIG. 4 illustrates examples of pieces of information on the electronic apparatuses 101 to 105. A model number represents a type of electronic apparatus. In an example in FIG. 4, a type of each of the electronic apparatuses 101 to 103 is "printer", and a model name of each of the electronic apparatuses 104 and 105 is "scanner". The model name here may be a general name of an electronic apparatus, may be a product number that is stipulated by a manufacturer, and may be any other information. In any case, the model name here is simple information that is easy for the user to understand when specifying the electronic apparatus, and it is assumed that a mode name each electronic apparatus is registered as a host name (one portion of the domain name). However, because the model name is simple, as illustrated in FIG. 4, it is easy for collision among multiple apparatuses to occur.

An IP address in FIG. 4 represents an IP address that is allocated to each of the electronic apparatuses 101 to 105. It is noted that in the electronic apparatus 102, an IP address is changed from "22.22.22.22" to "66.66.66.66".

A serial number corresponds to identification information on each of the electronic apparatuses 101 to 105. In an example in FIG. 4, for brief description, a two-digit numerical value is used as a serial number. However, as described above, it is desirable that the identification information is not the same as those of the multiple apparatus, and in practice, more complete information is used.

A setting of a registration destination represents a domain in which the electronic apparatuses 101 to 105 are registered. At this point, all electronic apparatus 101 to 105 are registered in a domain named "example.jp". The DNS server 200 includes a route name server, a content server for "jp", and a content server for "example.jp", and domain names or resource records of the electronic apparatuses 101 to 105 are managed by content server for "example.jp". It is noted that the DNS server 200 includes a cache server (a full service resolver), an inquiry from a DNS client such as each of the electronic apparatus 101 to 105 or the terminal apparatus 300 is processed by the cache server. Furthermore, each content server or the like is made to be redundant with multiple servers. That is, the DNS server 200 according to the present embodiment is not limited to a single server, and may be a server group (a DNS server group) that is configured from multiple servers. The registration processing by the electronic apparatus 100 may be performed on a single server or multiple servers in the DNS server group. It is noted that an inquiry which is made by the DNS client to the cache server, or an inquiry which is made by the cache server to each content server is widely known as DNS standards and thus that a detailed description thereof is omitted.

Processing according to the present embodiment will be described in detail below with reference to FIGS. 3 and 4. Specifically, a technique that performs avoidance of the collision of the domain name among the corresponding apparatuses is described as a first embodiment. In the first embodiment, a technique that avoids the collision of the domain name among the electronic apparatuses 101 to 103.

Furthermore, the technique that desirably avoids the collision of the domain name even in a case where the non-corresponding apparatus is included in the communication system 10 is described as a second embodiment. In the second embodiment, the technique that avoids the collision of the domain name, specifically in a case where the electronic apparatus 104 is included is described.

2.1 First Embodiment (Avoidance of Overlapping Between the Corresponding Apparatuses)

Non-Collision Case

A processing procedure according to the first embodiment is described. It is assumed that processing is started in a state where none of the domain names of the apparatuses is registered with the DNS server 200. It is assumed that at this point, the electronic apparatus 101 is powered on. In this case, the electronic apparatus 101 makes an attempt to register "printer.example.jp" as a domain name using "printer" that is a model name of the electronic apparatus 101 itself.

Specifically, a processing unit (the processing unit 110 of the electronic apparatus 100) of the electronic apparatus 101 makes an acquisition request to the DNS server 200 for the TXT record that corresponds to "printer.example.jp". At this point, because the domain name "printer.example.jp" is not registered with the DNS server 200, the TXT record is not present. In a case where the TXT record is not present in a DNS packet that is returned as a response from the DNS server 200, the electronic apparatus 101 determines that the domain name "printer.example.jp" is not registered. More specifically, by referring to RDATA that represents a value of a resource record or RDLENGTH that represents a length of RDATA, of a format of the DNS packet, it can be determined whether or not the TXT record is present. Alternatively, by referring to a header of the DNS packet that is returned as a response from the DNS server 200, it may be determined whether or not the domain name is registered. Specifically, in a case where the DNS packet, in which RCODE of the header is set to be at a value representing that "the domain name is not present (NXDOMAIN)", is acquired, it is determined that the domain name is not registered.

In this case, the electronic apparatus 101 can determine that "printer.example.jp" is not used for any other apparatus and is available as a domain name representing the electronic apparatus 101 itself. Consequently, in a case where the domain name that is the same as the domain name of the electronic apparatus 100 (the electronic apparatus 101) is not present in the DNS server 200, the processing unit 110 performs processing that registers the domain name of the electronic apparatus 100, the IP address of the electronic apparatus 100, and the identification information on the electronic apparatus 100 with the DNS server 200, in a state of being associated with each other. If this is done, it is checked that the collision with any other apparatus does not occur, and then it is possible that the domain name of the electronic apparatus 101 itself is registered with the DNS server 200. In that case, by associating identification information on the electronic apparatus 101 itself, it is also possible that any other corresponding apparatus registration suitably performs registration or that the electronic apparatus 101 itself suitably performs reregistration.

Specifically, the electronic apparatus 101 registers "11.11.11.11" in the A record in a state of being associated with "printer.example.jp", and makes a request for the DNS server 200 to register "serial=11" in the TXT record. FIG. 5 is a diagram illustrating a situation of the registration with the DNS server 200 at a point in time where the registration relating to the domain name of the electronic apparatus 101 is completed.

Collision Case

It is assumed that in a situation which is illustrated in FIG. 5, the electronic apparatus 102 is powered on. The electronic apparatus 102 makes an attempt to register "printer.example.jp" as a domain name.

Specifically, the processing unit 110 of the electronic apparatus 102 makes an acquisition request to the DNS server 200 for the TXT record that corresponds to "printer.example.jp". As illustrated in FIG. 5, because the TXT record that corresponds to "printer.example.jp", has already been registered, the DNS server 200 replies to the electronic apparatus 102 with the TXT record that includes the information "serial=11".

The electronic apparatus 102 compares the acquired "serial=11" and a serial number "22" of the electronic apparatus 102 itself, and thus can determine whether the identification information is not the same. That is, the electronic apparatus 102 can determine that "printer.example.jp" is used for any other corresponding apparatus and cannot be used as a domain name representing the electronic apparatus 102 itself.

Consequently, in a case where identification information is present in the DNS server 200 and the acquired identification information is not the same as the identification information on the electronic apparatus 100 (the electronic apparatus 102), the processing unit 110 changes the domain name of the electronic apparatus 100 and performs processing that registers the IP address of the electronic apparatus 100 and the identification information on the electronic apparatus 100 with the DNS server 200, in a state of being associated with a post-change domain name of the electronic apparatus 100.

Specifically, the electronic apparatus 102 changes the domain name from "printer.example.jp" to "printer-2.example.jp", and makes an attempt to register "printer-2.example.jp". The same is also true for a procedure at this time. The processing unit 110 of the electronic apparatus 102 makes an acquisition request for the DNS server 200 for the TXT record that corresponds to "printer-2.example.jp". Because the domain name "printer-2.example.jp" is not registered with the DNS server 200, the TXT record is not present. Consequently, the electronic apparatus 102 makes a request for the DNS server 200 to register "22.22.22.22" in the A record and "serial=22" in the TXT record, in a state of being associated with "printer-2.example.jp". FIG. 6 is a diagram illustrating a situation of the registration with the DNS server 200 at a point in time where the registration relating to the domain name of the electronic apparatus 102 is completed.

It is noted that, in the above description, the post-change domain name is set to be "printer-2.example.jp", but no limitation to this is imposed. In the case of a domain name that is easy for the user to understand and is different from the post-change domain name, a change to any domain name is allowed.

Case where Collision Occurs Multiple Times

In the electronic apparatus 102, with the domain name is changed one time, and thus the collision is prevented and the registration of "printer-2.example.jp" succeeds. However, depending on the situation, in some cases, the collision is not prevented with the post-change domain name.

It is assumed that in a situation which is illustrated in FIG. 6, the electronic apparatus 103 is powered on. The electronic apparatus 103 makes an attempt to register "printer.example.jp" as a domain name.

Specifically, the processing unit 110 of the electronic apparatus 103 makes an acquisition request to the DNS server 200 for the TXT record that corresponds to "printer.example.jp". As illustrated in FIG. 6, because the TXT record that corresponds to "printer.example.jp" has already been registered by the electronic apparatus 101, the DNS server 200 replies to the electronic apparatus 103 with the TXT record that includes the information "serial=11".

The electronic apparatus 103 compares the acquired "serial=11" and a serial number "33" of the electronic apparatus 103 itself, and thus can determine whether the identification information is not the same. That is, the electronic apparatus 103 can determine that "printer.example.jp" is used for any other corresponding apparatus and cannot be used as a domain name representing the electronic apparatus 103 itself. Consequently, the electronic apparatus 103 changes the domain name from "printer.example.jp" to "printer-2.example.jp", and makes an attempt to register "printer-2.example.jp".

The processing unit 110 of the electronic apparatus 103 makes an acquisition request for the DNS server 200 for the TXT record that corresponds to "printer-2.example.jp". As illustrated in FIG. 6, because the TXT record that corresponds to "printer-2.example.jp" has already been registered by the electronic apparatus 102, the DNS server 200 replies to the electronic apparatus 103 with the TXT record that includes the information "serial=22".

The electronic apparatus 103 compares the acquired "serial=22" and a serial number "33" of the electronic apparatus 103 itself, and thus can determine whether the identification information is not the same. That is, the electronic apparatus 103 can determine that "printer-2.example.jp" is also used for any other corresponding apparatus and cannot be used as a domain name of the electronic apparatus 103 itself. Consequently, the electronic apparatus 103 again changes the domain name. Specifically, the domain name is changed from "printer-2.example.jp" to "printer-3.example.jp" and an attempt is made to register "printer-3.example.jp". It is noted that "printer-3.example.jp" is not the same as printer.example.jp" and "printer-2.example.jp" and that a modified implement ion is possible that uses any other domain name that is easy for the user to understand.

The processing unit 110 of the electronic apparatus 103 makes an acquisition request for the DNS server 200 for the TXT record that corresponds to "printer-3.example.jp". Because the domain name "printer-3.example.jp" is not registered with the DNS server 200, the TXT record is not present. Consequently, the electronic apparatus 103 registers "33.33.33.33" in the A record in a state of being associated with "printer-3.example.jp", and makes a request for the DNS server 200 to register "serial=33" in the TXT record. FIG. 7 is a diagram illustrating a situation of the registration with the DNS server 200 at a point in time where the registration relating to the domain name of the electronic apparatus 103 is completed.

Case where the Electronic Apparatus Itself was Registered in the Past

The processing in the case which each of the electronic apparatuses 101 to 103 registers the domain name of its own for the first time is described above. However, each apparatus performs the registration processing intermittently. For example, as described above, when the electronic apparatus 100 is powered on, the processing unit 110 of the electronic apparatus 100 performs the processing that reregisters the domain name of the electronic apparatus 100, which is stored in the storage unit 160, with the DNS server 200.

It is assumed that in a situation that is illustrated in FIG. 7, the electronic apparatus 101 is again powered on. Because the storage unit 160 of the electronic apparatus 101 stores "printer.example.jp" that is the domain name which has been registered, the processing unit 110 makes an attempt to reregister "printer.example.jp".

The processing unit 110 of the electronic apparatus 101 makes an acquisition request to the DNS server 200 for the TXT record that corresponds to "printer.example.jp". As illustrated in FIG. 7, because the TXT record that corresponds to "printer.example.jp" has already been registered by the electronic apparatus 101 itself, the DNS server 200 replies to the electronic apparatus 101 with the TXT record that includes the information "serial=11".

The electronic apparatus 101 compares the acquired "serial=11" and a serial number "11" of the electronic apparatus 101 itself, and thus can determine whether the identification information is the same. That is, the electronic apparatus 101 can determine that "printer.example.jp" is the domain name which is registered by the electronic apparatus 101 itself and thus continues to be usable.

Consequently, in a case where the identification information, which is associated with the domain name that is the same as the domain name of the electronic apparatus 100, is present in the DNS server 200 and where the acquired identification information is the same as the identification information on the electronic apparatus 100, the processing unit 110 of the electronic apparatus 100 (the electronic apparatus 101) performs processing that updates at least one of the IP address and the identification information that are associated with the domain name of the electronic apparatus 100, based on the IP address and the identification information on the electronic apparatus 100.

Specifically, the electronic apparatus 101 registers "11.11.11.11" in the A record in a state of being associated with "printer.example.jp", and makes a request for the DNS server 200 to register "serial=11" in the TXT record. In this case, the A record and the TXT record do not change from a pre-reregistration-request state (FIG. 7), but a reregistration request is made. Thus, the term of validity of each record is updated. With a setting of the DNS server 200, the term of validity expires and thus the resource record is erased. However, with the reregistration, extension of the term of validity is possible.

It is noted that only one of the IP address and the identification information may be updated and both may be updated. As will be described below with reference to FIG. 12 or 13, in some cases, the term of validity of the IP address and the term of validity of the identification information are used for processing. In such cases, both the IP address and the identification information need to be update targets.

Case where the Electronic Apparatus Itself was Registered in the Past (the IP Address Changed)

Furthermore, in some cases, the IP address that is allocated to an apparatus changes. In the case of a variable IP address, for example, an IP address is dynamically determined at a timing where the apparatus makes a connection to a network. Because of this, there is a likelihood that the IP address will change each time a connection is made. In DNS (in a narrow sense, Dynamic Domain Name System (DDNS)), even in a case where an IP address changes, access is possible with the same domain name. Because of this, association of a domain name and an IP address that changes dynamically are performed.

For example, as illustrated in FIG. 4, a case is considered where the electronic apparatus 102 registers "22.22.22.22" in the A record in a state of being associated with "printer-2.example.jp" and then an IP address of the electronic apparatus 102 changes to "66.66.66.66". Because "printer-2.example.jp" that is the domain name which has been registered is stored in the storage unit 160 of the electronic apparatus 102, the processing unit 110 makes an attempt to reregister "printer-2.example.jp".

The processing unit 110 of the electronic apparatus 102 makes an acquisition request to the DNS server 200 for the TXT record that corresponds to "printer-2.example.jp". As illustrated in FIG. 7, because the TXT record that corresponds to "printer-2.example.jp" has already been registered by the electronic apparatus 102 itself, the DNS server 200 replies to the electronic apparatus 102 with the TXT record that includes the information "serial=22".

The electronic apparatus 102 compares the acquired "serial=22" and a serial number "22" of the electronic apparatus 102 itself, and thus can determine whether the identification information is the same. That is, the electronic apparatus 102 can determine that "printer-2.example.jp" is the domain name which is registered by the electronic apparatus 102 itself and thus continues to be usable.

Figure 9:
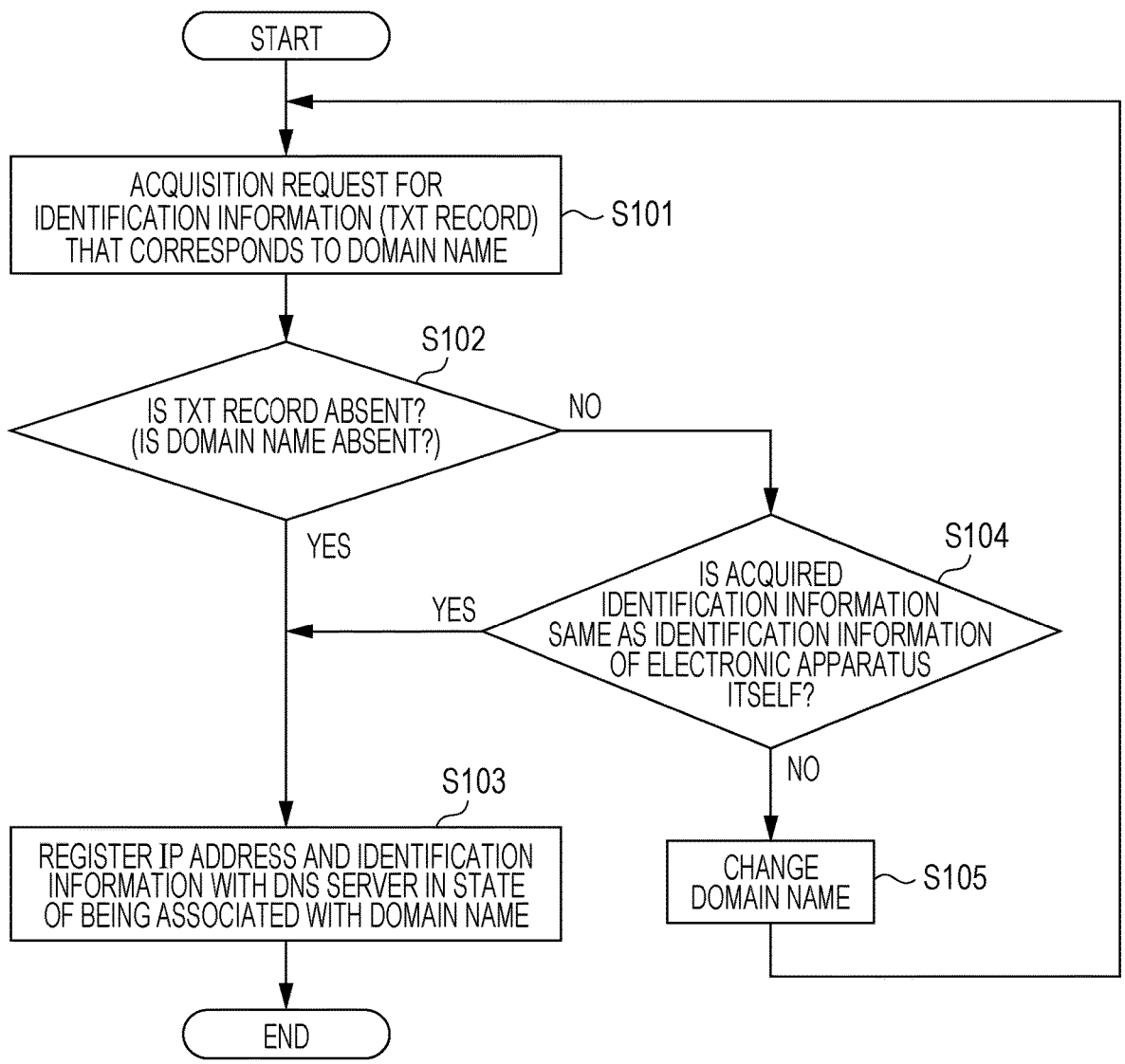
FIG. 9 is a flowchart for describing processing according to a first embodiment.

In this case, the electronic apparatus 102 registers "66.66.66.66" that is a post-change IP address, in the A record in a state of being associated with "printer-2.example.jp", and makes a request for the DNS server 200 to register "serial=22" in the TXT record. FIG. 8 is a diagram illustrating a situation of the registration with the DNS server 200 at a point in time where the update relating to the domain name of the electronic apparatus 102 is completed. Flow for Processing As described above, according to the first embodiment, the collision of the domain name at least between the corresponding apparatuses can be suppressed. FIG. 9 is a flowchart for describing processing that is performed in the processing unit 110 of the electronic apparatus 100 according to the first embodiment.

When the processing is started, the processing unit 110 of the electronic apparatus 100 makes an acquisition request to the DNS server 200 for identification information that corresponds to a domain name that the electronic apparatus 100 itself is going to use (S101). Next, the processing unit 110 determines whether or not the domain name is present in the DNS server 200, specifically, whether or not the TXT record is unacquired in response to the acquisition request in S101 (S102).

In a case where the TXT record is not present (Yes in S102), it is determined that the domain name on which an inquiry is made is not used in any apparatus. Consequently, the processing unit 110 makes a request for the DNS server 200 to register an IP address and identification information on the electronic apparatus 100 itself in a state of being associated with the domain name (S103).

In a case where the TXT record is present (No in S102), the processing unit 110 determines that the acquired identification information and the identification information on the electronic apparatus 100 itself are the same (S104). In a case where the pieces of identification information are not the same (No in S104), it is determined that any other corresponding apparatus already uses the same domain name. Consequently, the processing unit 110 changes the domain name (S105), returns to S101, and performs the reference processing of a post-change domain name on the DNS server 200.

In a case where the TXT record is present (No in S102), and where the acquired identification information and the identification information on the electronic apparatus 100 are the same (Yes in S104), it is determined that the domain name is the one that the electronic apparatus 100 itself registers. Consequently, the processing unit 110 makes a request for the DNS server 200 to register an IP address and identification information on the electronic apparatus 100 itself in a state of being associated with the domain name (S103). The processing in S103 in this case is equivalent to a request for update of an IP address and an identification information.

2.2 Second Embodiment

With the technique that is described above in the first embodiment, it is possible that the collision of the domain name between the corresponding apparatuses is suppressed. However, all apparatuses that are deployed by the user are not limited to the corresponding apparatuses, and, in some case, as the electronic apparatus 104 is present in FIG. 3, the corresponding apparatus and the non-corresponding apparatus are present in a mixed manner in the communication system 10. In the second embodiment, a technique is described that possibly suppresses the collision of the domain name even in a case where the non-corresponding apparatus is present in a mixed manner.

Case where the Registration Processing of the Corresponding Apparatus is Performed after the Non-Corresponding Apparatus is Registered It is assumed that in a situation which is illustrated in FIG. 8, the electronic apparatus 104 is powered on. In this case, the electronic apparatus 104 makes an attempt to register "scanner.example.jp" as a domain name using "scanner" that is a model name of the electronic apparatus 104 itself. Because the electronic apparatus 104 is a non-corresponding apparatus, the electronic apparatus 104 does not perform the processing that, as in the corresponding apparatus, refers to the identification information prior to registration. Consequently, regardless of whether or not the domain name is the same, the electronic apparatus 104 makes a request for the DNS server 200 to register an IP address "44.44.44.44" in the A record in a state of being associated with "scanner.example.jp". Because the electronic apparatus 104 is a non-corresponding apparatus, the electronic apparatus 104 does not make a request to register identification information "44" on the electronic apparatus 104 in the TXT record.

In a situation in FIG. 8, because "scanner.example.jp" is not registered, a problem particularly does not occur. FIG. 10 is a diagram illustrating a situation of the registration with the DNS server 200 at a point in time where the registration relating to the domain name of the electronic apparatus 104 is completed.

As illustrated in FIG. 10, in the registration processing of the non-corresponding apparatus, the A record corresponding to the domain name is registered, but the registration in the TXT record is not performed. For this reason, in the reference processing by the corresponding apparatus, the TXT record corresponding to the domain name is not present, but it cannot be determined that the domain name is not in use. In an example in FIG. 10, the TXT record that corresponds to "scanner.example.jp", is not present, but there is an error in determining that "scanner.example.jp" is not in use.

Thus, the processing unit 110 according to the present embodiment makes an acquisition request to the DNS server 200 for an IP address and identification information that are associated with a domain name that is the same as the domain name of the electronic apparatus 100. More specifically, processing is performed that transmits the DNS packet which requests the acquisition of the A record and the TXT record that correspond to the domain name to the DNS server 200.

In a case where both the IP address and the identification information are not present, the domain name is not present in the DNS server 200, and the processing unit 110 determines that the collision of the domain name does not occur. That is, as in a case where a result of the determination in S102 in FIG. 9 is Yes, the processing unit 110 of the electronic apparatus 100 registers the IP address and the identification information on the electronic apparatus 100 itself, with the DNS server 200, in a state of being associated with the domain name.

In contrast to this, in a case where the IP address is present and where the identification information is not present, as illustrated in FIG. 10, it is determined that the non-corresponding apparatus already uses the same domain name. Consequently, the processing unit 110 changes the domain name of the electronic apparatus 100, and performs processing that registers the IP address of the electronic apparatus 100 and the identification information on the electronic apparatus 100 with the DNS server 200, in a state of being associated with a post-change domain name of the electronic apparatus 100.

A specific example will be described below. It is assumed that in a situation which is illustrated in FIG. 10, the electronic apparatus 105 that is a corresponding apparatus is powered on. The electronic apparatus 105 makes an attempt to register "scanner.example.jp" as a domain name.

Specifically, the processing unit 110 of the electronic apparatus 105 makes an acquisition request to the DNS server 200 for the TXT record and the A record that correspond to "scanner.example.jp". As illustrated in FIG. 10, the A record "44.44.44.44" and the TXT record that does not include a character string such as "serial=" is returned as a response, as the resource record that corresponds to "scanner.example.jp". The TXT record is unoccupied (no data) in a narrow sense.

Because the IP address is present but the identification information is not present, the electronic apparatus 105 can determine that "scanner.example.jp" is used for the non-corresponding apparatus and cannot be used as a domain name that represents the electronic apparatus 105 itself. Consequently, the electronic apparatus 105 changes the domain name from "scanner.example.jp" to "scanner-2.example.jp", and makes an attempt to register "scanner-2.example.jp". The processing unit 110 of the electronic apparatus 105 makes an acquisition request to the DNS server 200 for the TXT record and the A record that corresponds to "scanner-2.example.jp". Because the domain name "scanner-2.example.jp" is not registered with the DNS server 200, neither the TXT record nor the A record are present. Consequently, the electronic apparatus 105 makes a request for the DNS server 200 to register "55.55.55.55" in the A record and register "serial=55" in the TXT record in a state of being associated with "scanner-2.example.jp". FIG. 11 is a diagram illustrating a situation of the registration with the DNS server 200 at a point in time where the registration relating to the domain name of the electronic apparatus 105 is completed.

Case where the Registration Processing of the Non-Corresponding Apparatus is Performed after the Corresponding Apparatus is Registered As described above, if the domain name is in use when the non-corresponding apparatus is registered, a problem particularly does not occur. Although the corresponding apparatus is set to make an attempt to register the same domain name after the non-corresponding apparatus is registered, because the domain name is changed on the corresponding apparatus side, the collision can be suppressed. However, in a case where the non-corresponding apparatus performs the registration of the same domain name after the corresponding apparatus is registered, attention needs to be put on this.

For example, it is assumed that in a situation which is illustrated in FIG. 8, the electronic apparatus 105 that is a corresponding apparatus is powered on. In this case, the electronic apparatus 105 makes an attempt to register "scanner.example.jp" as a domain name using "scanner" that is a model name of the electronic apparatus 105 itself. The processing unit 110 of the electronic apparatus 105 makes an acquisition request to the DNS server 200 for the TXT record and the A record that correspond to "scanner.example.jp". In a situation in FIG. 8, the domain name "scanner.example.jp" is not registered with the DNS server 200. Because of this, neither the TXT record nor the A record are present. Consequently, the electronic apparatus 105 makes a request for the DNS server 200 to register "55.55.55.55" in the A record and register "serial=55" in the TXT record in a state of being associated with "scanner.example.jp". A1 in FIG. 12 represents a portion that corresponds to the domain name "scanner.example.jp", of the situation of the registration with the DNS server 200 at a time where the registration relating to the domain name of the electronic apparatus 105 is completed.

Figure 12:
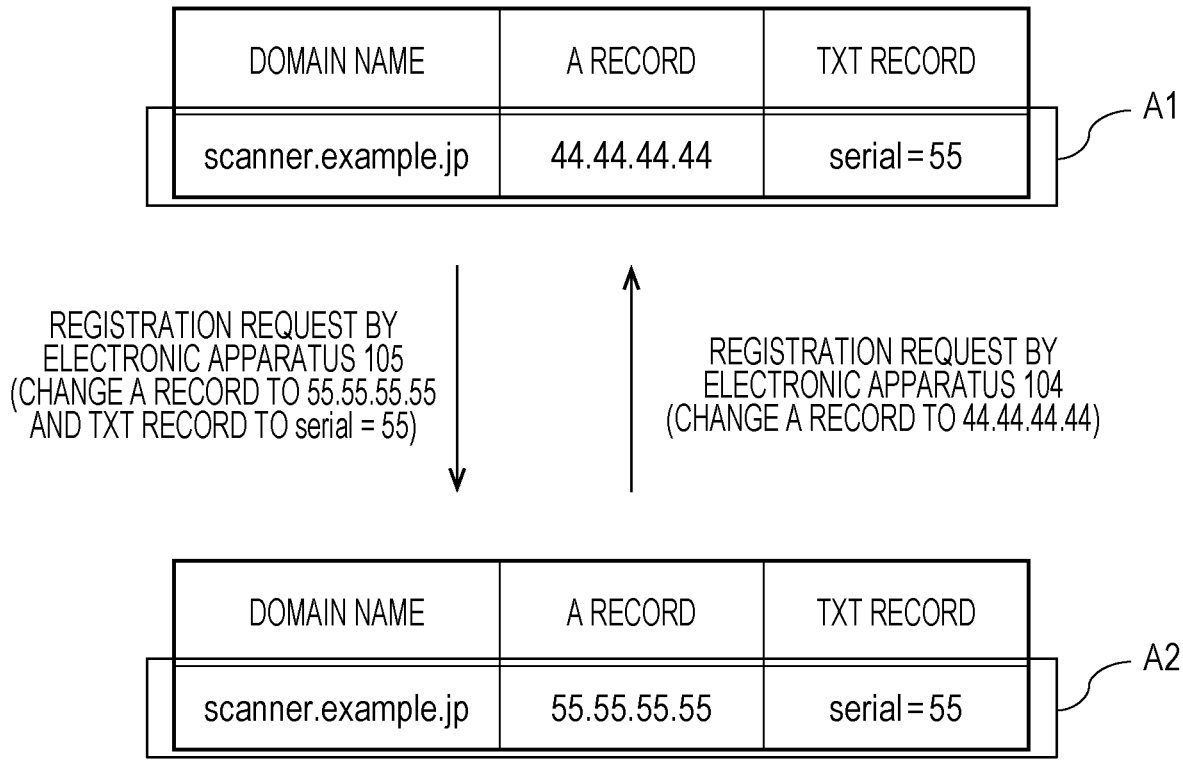
FIG. 12 is a descriptive diagram in a case where domain names of a corresponding apparatus and a non-corresponding apparatus collide with each other.

It is assumed that, in a situation where A1 in FIG. 12 is registered, the electronic apparatus 104 that is a non-corresponding apparatus is powered on. In this case, the electronic apparatus 104 makes an attempt to register "scanner.example.jp" as a domain name using "scanner" that is a model name of the electronic apparatus 105 itself. Because the electronic apparatus 104 is a non-corresponding apparatus, the electronic apparatus 104 does not perform the processing that, as in the corresponding apparatus, refers to the identification information prior to registration. Consequently, regardless of "scanner.example.jp" having been registered by the electronic apparatus 105, the electronic apparatus 104 makes a request for the DNS server 200 to register the IP address "44.44.44.44" in the A record in a state of being associated with "scanner.example.jp".

A2 in FIG. 12 represents a portion that corresponds to the domain name "scanner.example.jp", of the situation of the registration with the DNS server 200 at a time where the registration relating to the domain name of the electronic apparatus 104 is completed. As illustrated in A2, regardless of the electronic apparatus 105 previously registering the domain name, the IP address (the A record) is overwritten onto that of the electronic apparatus 104. On the other hand, because the electronic apparatus 104 performs registration relating to the TXT record, identification information on the electronic apparatus 105 is in a state of remaining left behind in the TXT record.

It is assumed that, in a situation where A2 in FIG. 12 is registered, the electronic apparatus 105 that is a corresponding apparatus is again powered on. The electronic apparatus 105 make an attempt to reregister the completely-registered domain name "scanner.example.jp", which is stored in the storage unit 160. The processing unit 110 of the electronic apparatus 105 makes an acquisition request to the DNS server 200 for the TXT record and the A record that correspond to "scanner.example.jp". As illustrated in A2, both the TXT record and the A record are present and the identification information that is included in the TXT record is the same as identification information "55" of the electronic apparatus 105 itself.

Because the identification information is the same, if a result of the determination is the same as in the first embodiment, the electronic apparatus 105 determines that "scanner.example.jp" is the domain name that is registered by the electronic apparatus 105 itself and is usable. As is described above with reference to FIG. 8, because an IP address of each apparatus dynamically changes, the acquired IP address and the IP address of the electronic apparatus 105 itself are not the same. This does not serve a basis for ensuring that the domain name is used by any other apparatus. The electronic apparatus 105 makes a request for the DNS server 200 to register "55.55.55.55" in the A record and register "serial=55" in the TXT record in a state of being associated with "scanner.example.jp". As a result, the situation of the registration with the DNS server 200 returns from A2 to A1. More precisely, in some cases, only with the presence or absence of the TXT record or the A record and the determination that the identification information is the same, the collision of the domain name between the corresponding apparatus and the non-corresponding apparatus cannot be sufficiently suppressed.

Consequently, the processing unit 110 according to the present embodiment makes an acquisition request for an IP address, identification information, the term of validity of the IP address, and the term of validity of the identification information, which are associated with a domain name that is the same as the domain name of the electronic apparatus 100. Then, in a case where the IP address is present, where the identification information is present, and where it is determined that the term of validity of the identification information is shorter than the term of validity of the IP address, the processing unit 110 changes the domain name of the electronic apparatus 100 and processing that registers a post-change domain name of the electronic apparatus 100 with the DNS server 200, in a state of being associated with the IP address of the electronic apparatus 100 and the identification information on the electronic apparatus 100.

As illustrated in FIG. 12, with the registration request by the electronic apparatus 105, registration of both the IP address and the identification information is performed. For this reason, in a situation of A1, the term of validity of the IP address and the term of validity of the identification information are equal to each other, but it is considered that a difference the two terms is sufficiently small. On the other hand, with the registration request by the electronic apparatus 104, the IP address is updated, but the identification information is not updated. For this reason, in the case of a comparison with A1, in a situation of A2, the term of validity of the identification information is obviously shorter than the term of validity of the IP address. The term of validity may be information indicating a date and time at which the term of validity expires, and may be information indicating the time that is left before the expiration of the term of validity. For example, as the term of validity, a value of time to live (TTL) in data in the resource record that is included in the DNS packet is used. Regardless of a format in which the term of validity is expressed, the term of validity being short means that the terms of validity expires at an earlier timing.

In this manner, the electronic apparatus 100 compares the term of validity of the IP address and the term of validity of the identification information, and thus determines whether a current situation is a situation where, as in A1, the domain name is usable or a situation where, as in A2, the domain name needs to be changed. Accordingly, even in a case where the non-corresponding apparatus is present in a mixed manner, it is possible that the collision of the domain name is suitably suppressed. With the technique according to the present embodiment, the non-corresponding apparatus overwriting the IP address can be avoided as transitioning from A1 to A2 takes place, but it is possible that the situation in A2 is suppressed from returning to the situation in A1.

Flow for Processing

Figure 13:
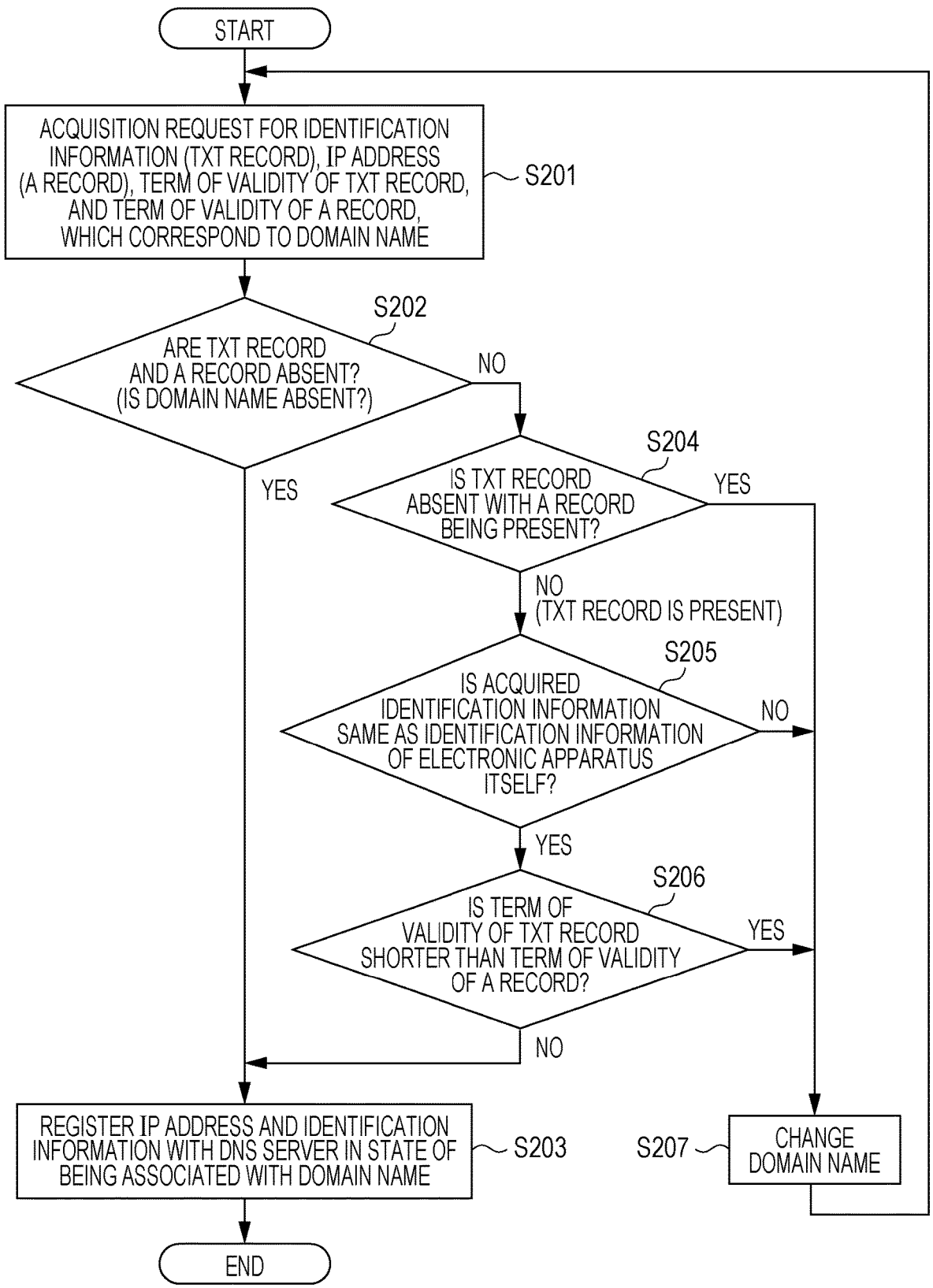
FIG. 13 is a flowchart for describing processing according to a second embodiment.

FIG. 13 is a flowchart for describing processing that is performed in a processing unit 110 of an electronic apparatus 100 according to the second embodiment. When the processing is started, the processing unit 110 of the electronic apparatus 100 makes an acquisition request to the DNS server 200 for identification information, an IP address, the term of validity of the identification information, and the term of validity of the IP address, which correspond to a domain name that the electronic apparatus 100 itself is going to use (S201). Next, the processing unit 110 determines whether or not the domain name is present, specifically, whether or not both the TXT record and the A record are unacquired in response to the acquisition request in S201 (S202).

In a case where both the TXT record and the A record are not present (Yes in S202), it can be determined that the domain name on which an inquiry is made is not in any apparatus. Because of this, a request is made for the DNS server 200 to register an IP address of, and identification information on, the electronic apparatus 100 itself in a state of being associated with the domain name (S203).

In a case where the A record is present, but the TXT record is not present (No in S202 and Yes in S204), as illustrated in FIG. 10, the processing unit 110 can determine that the non-corresponding apparatus already uses the same domain name. Consequently, the processing unit 110 changes the domain name (S207), returns to S201, and performs the reference processing of a post-change domain name on the DNS server 200.

Furthermore, in a case where both the A record and the TXT record are present (No in S204), the processing unit 110 determines that the acquired identification information and the identification information on the electronic apparatus 100 itself are the same (S205). In a case where the acquired identification information and the identification information on the electronic apparatus 100 itself are not the same (No in S205), it can be determined that any other corresponding apparatus already uses the same domain name. In this case, proceeding to processing in S207 also takes place.

Furthermore, in a case where the acquired identification information and the identification information on the electronic apparatus 100 itself (Yes in S205), the processing unit 110 performs processing that compares the term of validity of the TXT record and the term of validity of the A record (S206). In a case where it is determined that the term of validity of the TXT record is shorter than the term of validity of the A record (Yes in S206), it can be determined that the non-corresponding apparatus already uses the same domain name. In this case, proceeding to processing in S207 also takes place.

It is noted that the processing in S206 may be processing that simply compares the two terms of validity. Alternatively, the processing in S206 may be processing that sets a positive threshold and determines whether or not the term of validity of the TXT record is shorter by the positive threshold or above than the term of validity of the A record. Alternatively, the processing in S206 may be processing that specifies a timing of update of each resource record based on the term of validity and determines whether or not a timing of update of the TXT record is a timing that is earlier than a timing of update of the A record. Alternatively, the processing in S206 may be processing that determines whether or not the timing of update of the TXT record is a timing that is earlier by a prescribed threshold or above than the timing of update of the A record. In this manner, it is determined that the determination of the term of validity is realized by various processing operations.

In a case where a result in S206 is No, specifically, in a case where the term of validity of the TXT record and the term of validity of the A record are equal to each other, it can be determined that the domain name is registered by the electronic apparatus 100 itself. Consequently, the processing unit 110 makes a request for the DNS server 200 to register an IP address and identification information on the electronic apparatus 100 itself in a state of being associated with the domain name (S203). The processing in S203 in this case is equivalent to a request for update of an IP address and an identification information.

3. System and Program

Furthermore, the technique according to the present embodiment can find application in the electronic apparatus 100 (the corresponding apparatus) described above and a communication system that includes the DNS server 200. The communication system here, for example, is a system that includes the DNS server 200 and at least one of the electronic apparatus 101 to 103 and 105 that are corresponding electronic apparatuses, which are included in the communication system 10 in FIG. 3. It is noted that, as illustrated in FIG. 3, the communication system according to the present embodiment may include two or more corresponding apparatuses, and may include a non-corresponding apparatus.

Furthermore, one or several of, or most of the processing operations by the electronic apparatus 100 and the like according to the present embodiment may be realized by a program. In this case, a processor such as a CPU executes the program, and thus, the electronic apparatus 100 and the like according to the present embodiment are realized. Specifically, the program that is stored on a non-volatile information storage medium is read and the processor such as the CPU executes the program that is read. The information storage medium here is a computer-readable medium. A program, data, and the like are stored in the information storage medium. A function of the information storage medium can be realized by an optical disk (a DVD, a CD, or the like), an HDD, a memory, or the like. Then, the processor such as the CPU performs various processing operations according to the present embodiment based on the program that is stored in the information storage medium. That is, a program for causing a computer to function as each unit according to the present embodiment is stored in the information storage medium.

The embodiments and the modification examples thereof in which the invention finds application are described above, but the invention is not limited to the embodiments and the modification examples thereof as are. At stages of implementation, a constituent element can be modified and thus a modification thereof can be realized within the scope that does not depart from the gist of the invention. Furthermore, various inventions can be conceived and be reduced to practice by suitably combining the multiple constituent elements that are disclosed in each of the embodiments or each of the modification examples thereof, which are described above. For example, of all constituent elements that are described in each of the embodiments or each of the modification examples thereof, several constituent elements may be deleted. Moreover, the constituent elements that are described in the different embodiments or the different modification examples thereof may be suitably combined. Furthermore, in the specification or the drawings, a term that is described at least once together with a different term that has a broader meaning or the same meaning can be replaced with the different term, throughout the specification or the drawings. In this manner, various modifications or applications are possible within the scope that does not depart from the gist of the invention.

The entire disclosure of Japanese Patent Application No. 2018-023786, filed Feb. 14, 2018 is expressly incorporated by reference herein.

What is claimed is:

1. An electronic apparatus that is configured to register a domain name, an Internet Protocol (IP) address, and identification information on the electronic apparatus itself with a domain name system (DNS) server that stores a domain name, an IP address, and identification information on a prescribed apparatus in a state of being associated with each other, the electronic apparatus comprising:
    a communication unit that performs communication via a network; and
    a processing unit that performs communication control of the communication unit,
    wherein the processing unit that, when the domain name of the electronic apparatus is registered with the DNS server, makes an acquisition request to the DNS server for the identification information that is associated with a domain name that is the same as the domain name of the electronic apparatus, and
    wherein, in a case where the identification information is present in the DNS server and where the acquired identification information is not the same as the identification information on the electronic apparatus, the processing unit changes the domain name of the electronic apparatus, and performs processing that registers the IP address of the electronic apparatus and the identification information on the electronic apparatus with the DNS server in a state of being associated with a post-change domain name of the electronic apparatus.

2. The electronic apparatus according to claim 1,
    wherein, in a case where the identification information that is associated with the domain name which is the same as the domain name of the electronic apparatus is present in the DNS server and where the acquired identification information is the same as the identification information on the electronic apparatus, the processing unit performs processing that updates at least one of the IP address and the identification information that are associated with the domain name of the electronic apparatus.

3. The electronic apparatus according to claim 1,
    wherein, in a case where the domain name that is the same as the domain name of the electronic apparatus is not present in the DNS server, the processing unit performs processing that registers the domain name of the electronic apparatus, the IP address of the electronic apparatus, and the identification information on the electronic apparatus with the DNS server, in a state of being associated with each other.

4. The electronic apparatus according to claim 1,
    wherein the processing unit makes an acquisition request to the DNS server for the IP address and the identification information that are associated with the domain name which is the same as the domain name of the electronic apparatus, and
    wherein, in a case where the IP address is present and the identification information is not present, the processing unit changes the domain name of the electronic apparatus, and performs processing that registers the IP address of the electronic apparatus and the identification information on the electronic apparatus with the DNS server in a state of being associated with the post-change domain name of the electronic apparatus.

5. The electronic apparatus according to claim 4,
    wherein the processing unit makes an acquisition request with the DNS server for the IP address, the identification information, a term of validity of the IP address, and a term of validity of the identification information, which are associated with the domain name that is the same as the domain name of the electronic apparatus, and
    wherein, in a case where the IP address is present and the identification information is present and where it is determined that the term of validity of the identification information is shorter than the term of validity of the IP address, the processing unit changes the domain name of the electronic apparatus and performs processing that registers the post-change domain name of the electronic apparatus with the DNS server in a state of being associated with the IP address of the electronic apparatus and the identification information on the electronic apparatus.

6. The electronic apparatus according to claim 1, further comprising:
a storage unit in which the domain name of the electronic apparatus that is registered with the DNS server is stored,
wherein, when at least the electronic apparatus is powered on, the processing unit performs processing that reregisters the domain name of the electronic apparatus which is stored in the storage unit, with the DNS server.

7. The electronic apparatus according to claim 6,
wherein the storage unit is a non-volatile memory.

8. A communication system comprising:
a electronic apparatus according to claim 1; and
a DNS server,
the electronic apparatus comprising:
a communication unit that performs communication via a network; and
a processing unit that performs communication control of the communication unit,
wherein the processing unit that, when the domain name of the electronic apparatus is registered with the DNS server, makes an acquisition request to the DNS server for the identification information that is associated with a domain name that is the same as the domain name of the electronic apparatus, and
wherein, in a case where the identification information is present in the DNS server and where the acquired identification information is not the same as the identification information on the electronic apparatus, the processing unit changes the domain name of the electronic apparatus, and performs processing that registers the IP address of the electronic apparatus and the identification information on the electronic apparatus with the DNS server in a state of being associated with a post-change domain name of the electronic apparatus.

9. The communication system according to claim 8,
wherein, in a case where the identification information that is associated with the domain name which is the same as the domain name of the electronic apparatus is present in the DNS server and where the acquired identification information is the same as the identification information on the electronic apparatus, the processing unit performs processing that updates at least one of the IP address and the identification information that are associated with the domain name of the electronic apparatus.

10. The communication system according to claim 8,
wherein, in a case where the domain name that is the same as the domain name of the electronic apparatus is not present in the DNS server, the processing unit performs processing that registers the domain name of the electronic apparatus, the IP address of the electronic apparatus, and the identification information on the electronic apparatus with the DNS server, in a state of being associated with each other.

11. The communication system according to claim 8,
wherein the processing unit makes an acquisition request to the DNS server for the IP address and the identification information that are associated with the domain name which is the same as the domain name of the electronic apparatus, and
wherein, in a case where the IP address is present and the identification information is not present, the processing unit changes the domain name of the electronic apparatus, and performs processing that registers the IP address of the electronic apparatus and the identification information on the electronic apparatus with the DNS server in a state of being associated with the post-change domain name of the electronic apparatus.

12. The communication system according to claim 11,
wherein the processing unit makes an acquisition request with the DNS server for the IP address, the identification information, a term of validity of the IP address, and a term of validity of the identification information, which are associated with the domain name that is the same as the domain name of the electronic apparatus, and
wherein, in a case where the IP address is present and the identification information is present and where it is determined that the term of validity of the identification information is shorter than the term of validity of the IP address, the processing unit changes the domain name of the electronic apparatus and performs processing that registers the post-change domain name of the electronic apparatus with the DNS server in a state of being associated with the IP address of the electronic apparatus and the identification information on the electronic apparatus.

13. The communication system comprising: according to claim 8,
a storage unit in which the domain name of the electronic apparatus that is registered with the DNS server is stored,
wherein, when at least the electronic apparatus is powered on, the processing unit performs processing that reregisters the domain name of the electronic apparatus which is stored in the storage unit, with the DNS server.

14. The communication system according to claim 13,
wherein the storage unit is a non-volatile memory.

15. A non-transitory computer-readable recording medium in which a program is recorded, the program that operates an electronic apparatus that is configured to register a domain name, an IP address, and identification information on the electronic apparatus itself with a DNS server that stores a domain name, an IP address, and identification information on a prescribed apparatus in a state of being associated with each other, the program causing the electronic apparatus to function as:
a communication unit that performs communication via a network; and
a processing unit that performs communication control of the communication unit,
wherein the processing unit that, when the domain name of the electronic apparatus is registered with the DNS server, makes an acquisition request to the DNS server for the identification information that is associated with a domain name that is the same as the domain name of the electronic apparatus, and
wherein, in a case where the identification information is present in the DNS server and where the acquired identification information is not the same as the identification information on the electronic apparatus, the processing unit changes the domain name of the electronic apparatus, and performs processing that registers the IP address of the electronic apparatus and the identification information on the electronic apparatus with the DNS server in a state of being associated with a post-change domain name of the electronic apparatus.

* * * * *